UNITED STATES PATENT OFFICE.

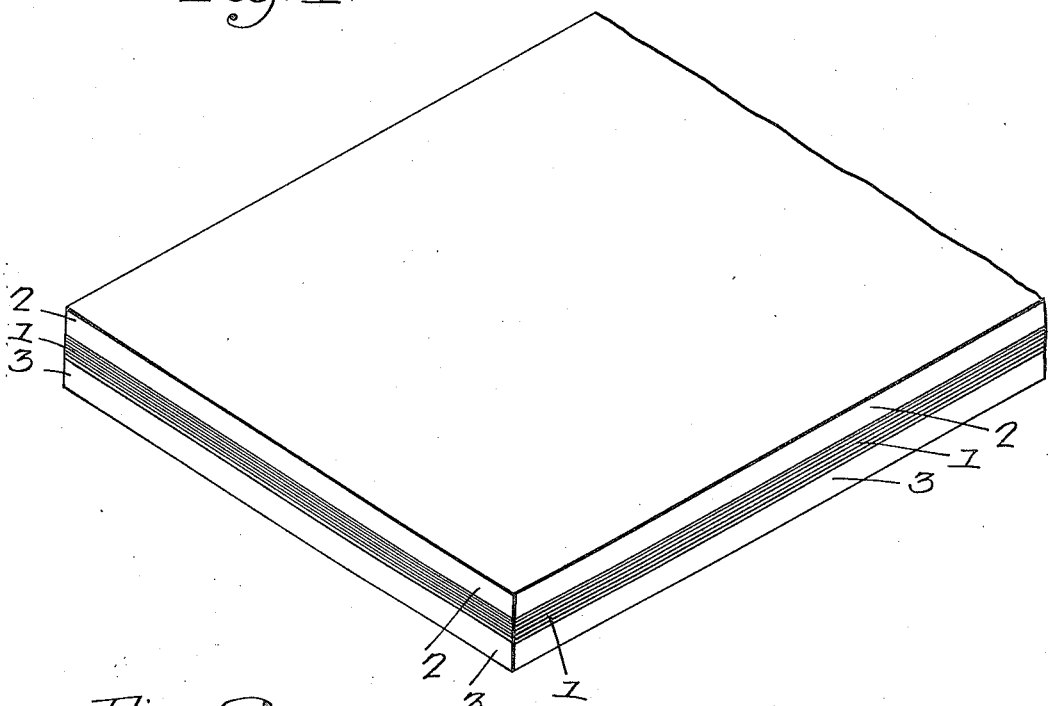
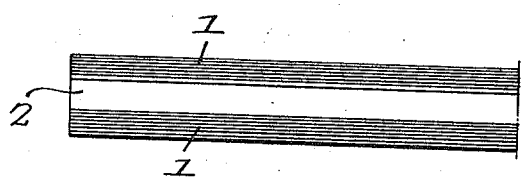

JOHN M. TAYLOR, OF ARDMORE, PENNSYLVANIA, ASSIGNOR TO DIAMOND STATE FIBRE COMPANY, OF ELSMERE, DELAWARE, A CORPORATION OF DELAWARE.

LAMINATED FIBER PRODUCT AND PROCESS OF MAKING THE SAME.

1,418,891.     Specification of Letters Patent.    Patented June 6, 1922.

Application filed October 27, 1921. Serial No. 510,688.

*To all whom it may concern:*

Be it known that I, JOHN M. TAYLOR, a citizen of the United States, residing in Ardmore, Pennsylvania, have invented Laminated Fiber Products and Processes of Making the Same, of which the following is a specification.

One object of this invention is to make a laminated material, preferably having parchmentized fiber as its base, which shall be waterproof, mechanically strong, hard, compact and relatively inexpensive to manufacture.

Another object of my invention is to provide a laminated product which while including ordinary vulcanized or parchmentized fiber, shall be substantially waterproof even at its edges.

Another object of my invention is to provide a novel process for making the above product.

These objects and other advantageous ends I attain as hereinafter set forth, reference being had to the accompanying drawings, in which, Fig. 1 is a perspective view of a body of laminated material embodying my invention; and Fig. 2 is a vertical section of a laminated block also made in accordance with my invention.

The product constituting my invention consists of a sheet or plate 1 of any desired thickness of ordinary parchmentized or vulcanized fiber having attached to one or both of its flat faces what are in effect one or more plates, sheets or layers 2 and 3 of vulcanized or parchmentized fiber or other woven or felted fabrics impregnated with a phenolic condensation product in its insoluble, infusible stage.

In making the composite plate or sheet of the above construction, I saturate or impregnate one or more sheets of parchmentized or unparchmentized fiber with a phenolic condensation product in its liquid or intermediate form, in which it is readily soluble in the ordinary solvents such as alcohol, acetone, etc.

For thus preparing these sheets of material I may treat them in accordance with the method described and claimed in the patent to McIntosh No. 1,236,460, dated August 14, 1917, and after said sheets have been dried I apply them to the opposite faces of a plate or sheet 1 of ordinary unimpregated parchmentized fiber. Thereafter the mass is placed between the heated platens of a suitable press whereby it is subjected to pressure such as one thousand pounds to the square inch at a temperature of one hundred and twenty-five pounds of steam. This heat and pressure are maintained for a time sufficient to cause the condensation product in the sheets 2 and 3 to pass into its final or insoluble, infusible form and at the same time said sheets are caused to so strongly adhere to the intermediate body of untreated, parchmentized fiber as to be integral therewith. Obviously the sheets 2 and 3 may be of any desired thickness as may also the intermediate sheet or plate 1 and if the platens of the press in which the operation is performed are highly polished, the external surfaces of the sheets 2 and 3 are given a high finish.

Owing to the above treatment and particularly to the fact that the untreated fiber sheet 1 is covered by the surface sheets 2 and 3 and is held by them from expansion, said sheet 1 is effectually prevented from absorbing water. Moreover, where the untreated parchmentized fiber, if immersed in water without the protective surface layers 2 and 3, will absorb 30% or more of its weight of water, when combined with the impervious layers or plates or sheets 3 and 2, in the same period of time it will absorb less than 1% of water even though its edges be exposed to and in direct contact with the same.

The hard waterproof layers 2 and 3 appear to so hold the intermediate layer of parchmentized fiber as to prevent its expansion and thus prevent it absorbing appreciable amounts of the water with which its edges are in contact.

The above described material is available for a wide variety of uses, such as a raw material from which machine elements such as gears, pulleys, or the like may be formed or machined and also as an electrical insulator, especially in the constructed of switchboards for radio apparatus, a material for making containers, or other structures which it is desirable shall be unaffected by moisture, oil or other liquids.

Obviously the finished composite plate made as above described may be made with less expense and in a shorter time than could a plate of the same thickness which was uniformly impregnated or saturated with the phenolic condensation product and is also tougher and stronger than a plate of the same dimensions made entirely of the solid phenolic condensation product.

Without departing from my invention I may for certain purposes provide a laminated structure consisting of a single layer of the vulcanized fiber impregnated with a phenolic condensation product with plates or sheets of untreated vulcanized fiber applied to the opposite faces thereof. I have illustrated this construction in Fig. 2, where 1—1 is the untreated vulcanized fiber applied to the opposite faces of a body 2 of vulcanized fiber which has been saturated with the condensation product or equivalent material in its intermediate stage.

As in that form of my invention shown in Fig. 1, the sheets 1—2—1 are subjected to heat and pressure so that they are consolidated into a single block or plate of material and as before the time of this treatment is such as to cause the condensation product to assume its final or solid insoluble form.

While I preferably make the unimpregnated layer or layers 1 of vulcanized or parchmentized fiber, I may for some purpose make these elements of so-called leather or fiber board which is unvulcanized and combine it or them with the impregnated layer or layers as above described.

It will be understood that the above described products may be built up, molded, machined or otherwise formed into any desired shapes, since its nature is such as to lend itself with peculiar facility to these operations.

I claim

1. The process which consists in applying to a sheet or fiber a sheet of material impregnated with a phenolic condensation product in its intermediate stage; and thereafter subjecting said sheets to heat and pressure to cause them to inseparably adhere and to change the condensation product to its final insoluble form.

2. The process which consists in applying to a sheet of parchmentized fiber a sheet of material impregnated with a phenolic condensation product in its intermediate stage; and thereafter subjecting said sheets to heat and pressure to cause them to adhere and to change the condensation product to its final insoluble form.

3. The process which consists in applying to a sheet of parchmentized fiber at least one sheet of fibrous material containing a substance capable of being made waterproof; and thereafter subjecting said sheets to a treatment to cause them to adhere together and cause said second sheet to become waterproof.

4. As a new article of manufacture, a laminated product consisting of a layer of fibrous material impregnated with a solidified phenolic condensation product and layers of unimpregnated fibrous material inseparably bound by said condensation product to the faces of said first layer.

5. As a new article of manufacture, a laminated product consisting of a layer of parchmentized fiber impregnated with a solidified phenolic condensation product and layers of unimpregnated fibrous material bound by said condensation product to the faces of said first layer.

6. As a new article of manufacture, a laminated product consisting of a layer of parchmentized fiber impregnated with a solidified phenolic condensation product and layers of unimpregnated parchmentized fiber bound by said condensation product to faces of said first layer.

JOHN M. TAYLOR.